United States Patent [19]

Orain

[11] Patent Number: 4,955,847
[45] Date of Patent: Sep. 11, 1990

[54] HOMOKINETIC TRANSMISSION JOINT HAVING A TRIPOD ELEMENT CONNECTED TO A HOUSING ELEMENT BY ROLLING ELEMENTS ON THE TRIPOD ELEMENT AND ROLLING TRACKS IN THE HOUSING ELEMENT

[75] Inventor: Michel A. Orain, Conflans Ste Honorine, France

[73] Assignee: Glaenzer-Spicer, Poissy, France

[21] Appl. No.: 260,515

[22] Filed: Oct. 20, 1988

[30] Foreign Application Priority Data

Oct. 27, 1987 [FR] France ............................ 87 14856
Mar. 3, 1988 [FR] France ............................ 88 02717
Mar. 3, 1988 [FR] France ............................ 88 02718

[51] Int. Cl.⁵ .............................................. F16D 3/205
[52] U.S. Cl. .................................... 464/111; 464/905
[58] Field of Search ............... 464/111, 122, 123, 124, 464/132, 905

[56] References Cited

U.S. PATENT DOCUMENTS

4,472,156 9/1984 Orain .................................. 464/111
4,512,750 4/1985 Orain .................................. 464/111
4,604,077 8/1986 Orain .................................. 464/111

FOREIGN PATENT DOCUMENTS

2582760 12/1986 France ............................. 464/111

Primary Examiner—Daniel P. Stodola
Attorney, Agent, or Firm—Wenderoth, Lind & Ponack

[57] ABSTRACT

In a joint, each arm (22) of a tripod element (14) is provided with two rolling elements (24) disposed on opposite sides of the arm. According to the invention, each rolling element (24) has a spherical rolling surface (32) and a conical rolling surface (34) which respectively cooperate with a spherical surface (38) of the bowl element (20) and a conical surface (40) of a web (32) of the bowl element. Each rolling element (24) is mounted on the arm (22) by means of a half bush (54) which allows the axial sliding and pivoting of the rolling element relative to the arm. A spring device biasing the two rolling elements away from each other in a direction perpendicular to the axis common to the respective concave cylindrical surface portions of the rolling elements is also provided.

30 Claims, 13 Drawing Sheets

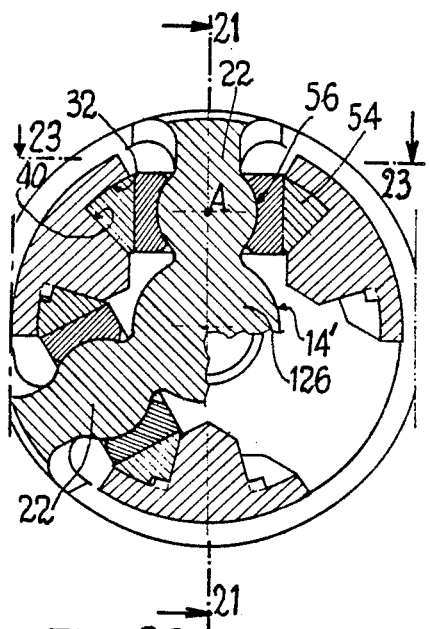
FIG.22
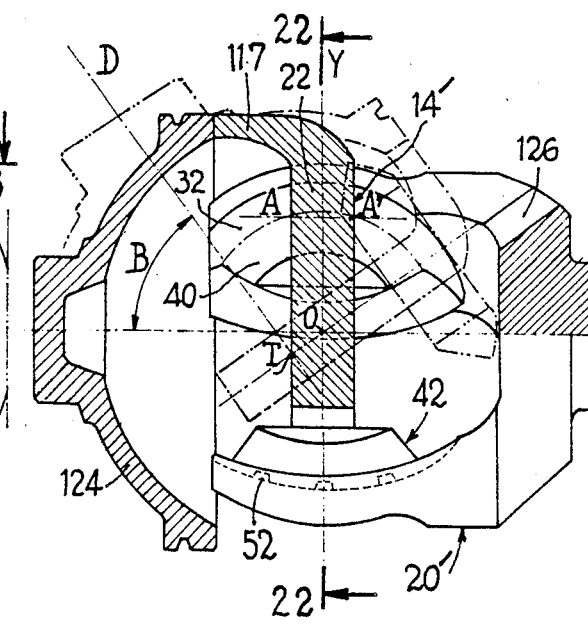
FIG.21
FIG.23
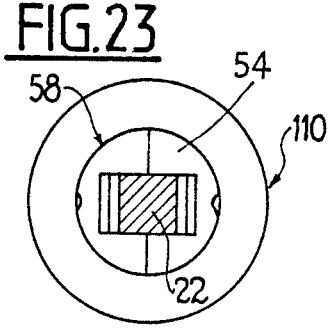
FIG.24b
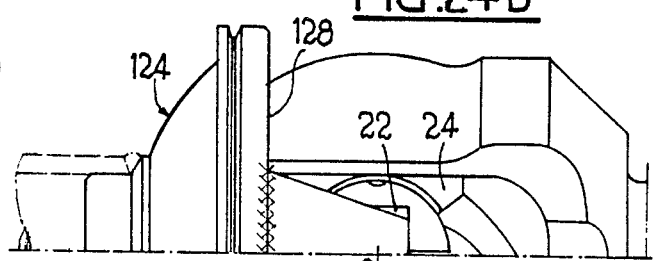
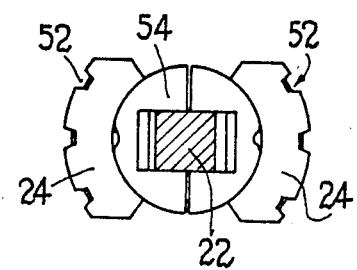
FIG.25
FIG.24a
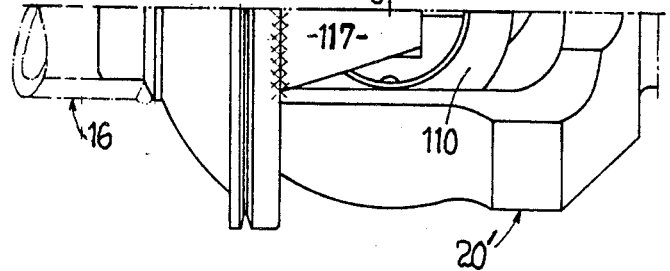

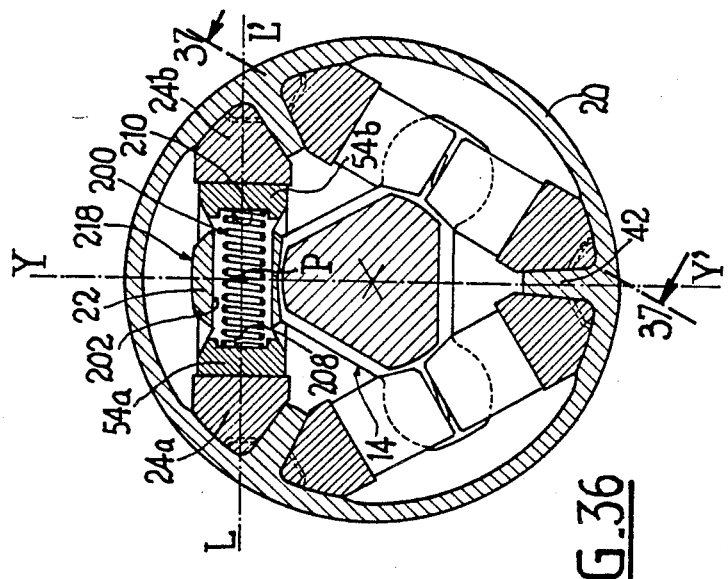
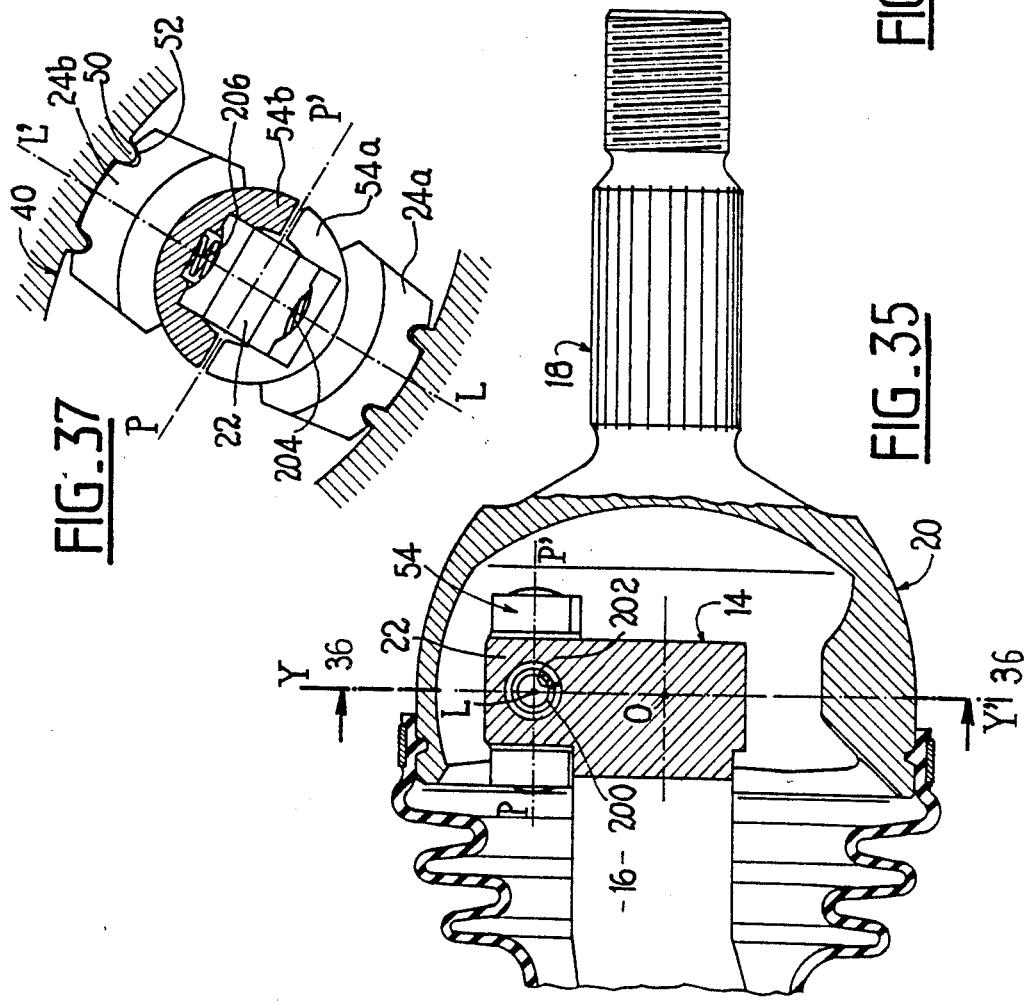

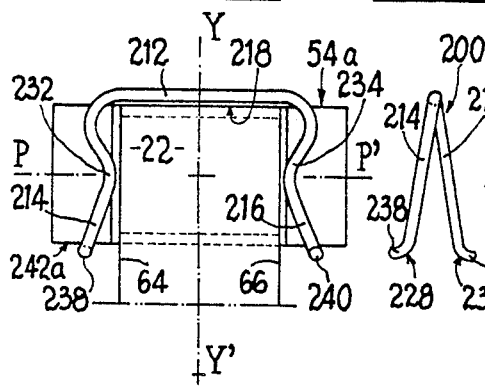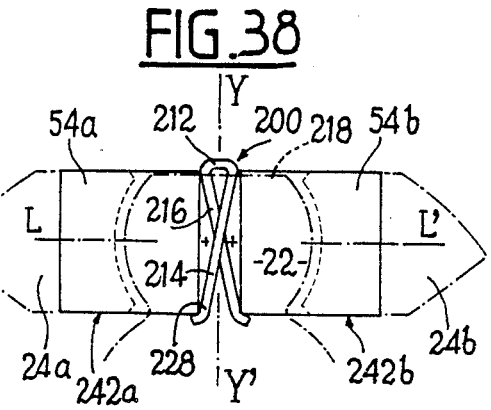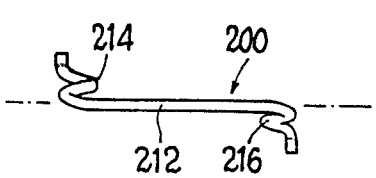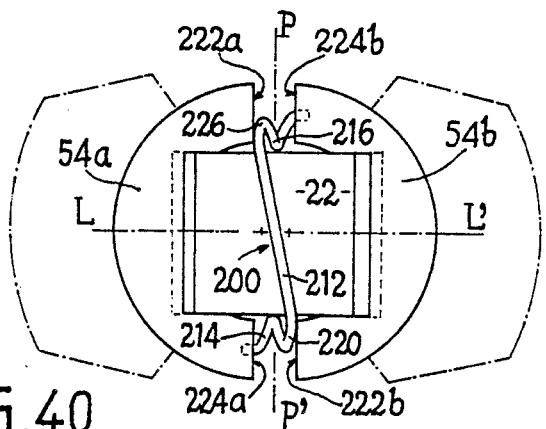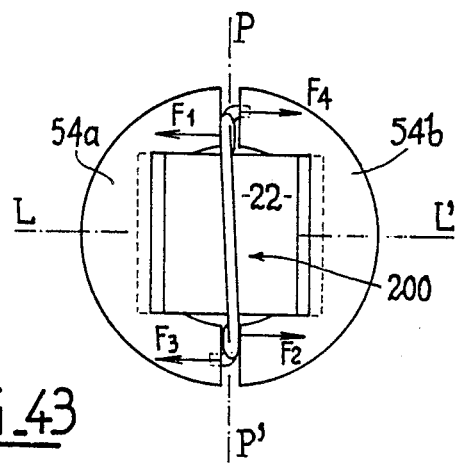

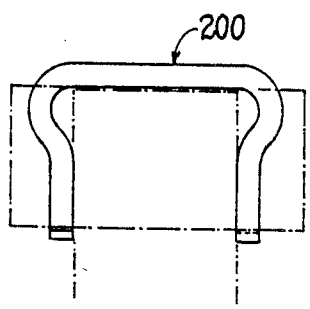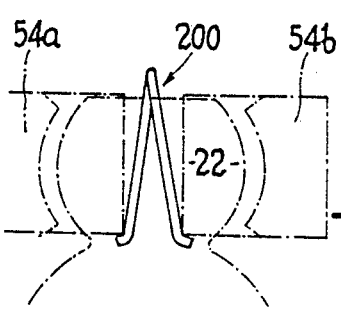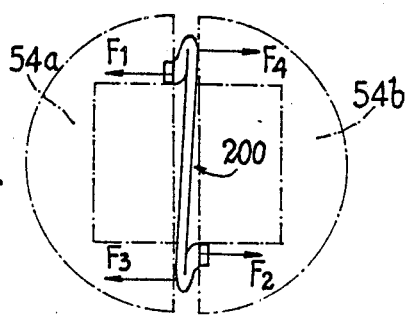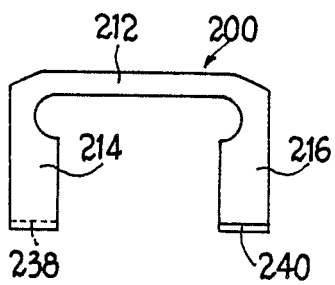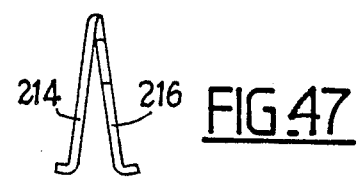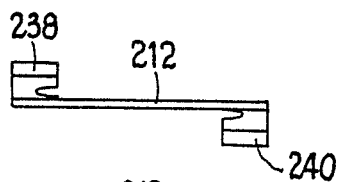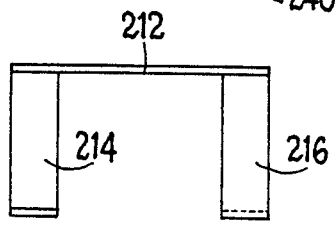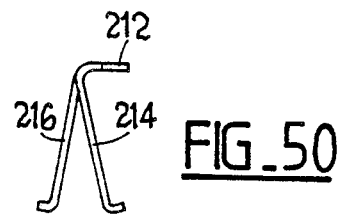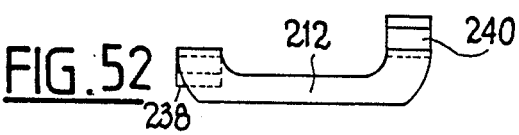

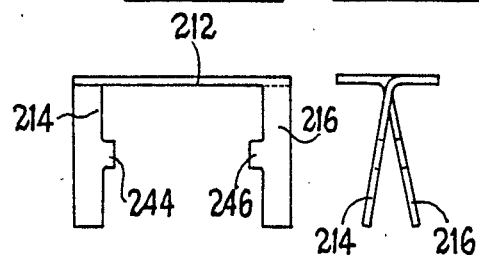
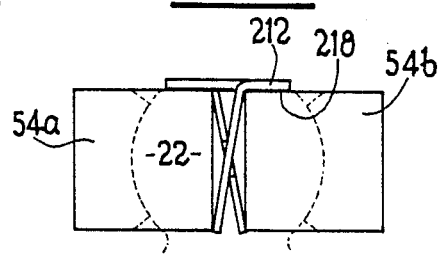
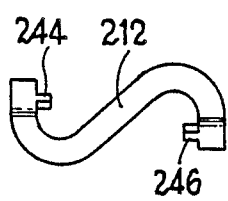
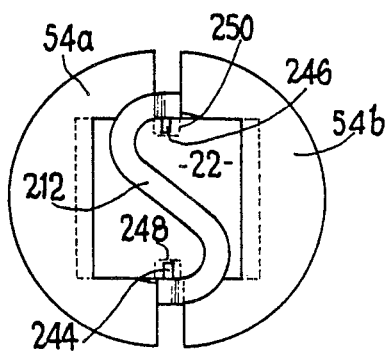

HOMOKINETIC TRANSMISSION JOINT HAVING A TRIPOD ELEMENT CONNECTED TO A HOUSING ELEMENT BY ROLLING ELEMENTS ON THE TRIPOD ELEMENT AND ROLLING TRACKS IN THE HOUSING ELEMENT

BACKGROUND OF THE INVENTION

1. Field of the Invention

The present invention relates to a homokinetic transmission joint of the type comprising a tripod element connected to a driving shaft and provided with three radial arms angularly spaced 120° apart, each radial arm being provided with two rolling elements disposed on opposite sides of the arm, each rolling element cooperating with a distinct rolling track provided in a housing element connected to a driven shaft.

2. State of the Prior Art

The document FR-B-2 525 306 describes and illustrates a homokinetic joint of the aforementioned type used in particular for driving steering and driving wheels of an automobile vehicle which is particularly compact and light.

The design of this type of tripod joint which is arranged to operate in rotation at a flexing angle, i.e. when the axis of the driven shaft makes an angle with the axis of the driving shaft, requires the allowance of an "offset" phenomenon, i.e. an offset of the axis of the driving shaft carrying the tripod element. This phenomenon requires the provision of a relatively large clearance between the rolling elements and the rolling tracks and a degree of freedom of inclination of these rolling elements in the bed of their corresponding rolling tracks.

These two combined features have the drawbacks of rendering uncertain the axial retention in a fixed position of one shaft relative to the other shaft when the joint is operating at a flexing angle, and producing phenomena of percussion, noise and deteriorations which are difficult to allow in normal operation of the joint.

SUMMARY OF THE INVENTION

In order to overcome these drawbacks, the invention provides a transmission joint of the aforementioned type wherein each rolling track is constituted by two concurrent surfaces, a first spherical surface formed in the inner wall of the housing element and having its center located on the second axis of the driven shaft, and a first surface of conical section formed on an inner web of the housing element and extending in a plane containing the axis of the driven shaft which is a portion of the surface of a cone whose apex coincides with the center of the spherical surface whose axis is perpendicular to the axis of the driven shaft and to the radial plane containing the radial axis of the arm and whose semi-angle is substantially equal to 30°.

Each rolling element comprises a portion having a concave cylindrical surface which cooperates with the arm to enable it to slide axially relative to the radial axis of the arm, a second spherical surface whose center is located on the axis of the concave cylindrical surface and whose radius is equal to the radius of the first spherical surface of the corresponding rolling track, and a second surface having a conical contour which is a portion of the surface of a cone whose center is coincident with the center of the second spherical surface whose axis is coincident with the axis of the concave cylindrical surface and whose semi-angle is substantially equal to 60°.

Each rolling element is pivotally mounted relative to the arm by means constituting a universal joint.

According to another feature of the invention and in order to constitute the means forming a joint of the Cardan type, each arm of the tripod element has two opposite portions having a convex cylindrical surface whose common axis is perpendicular to the plane of the tripod element, and in front of each of which is disposed a rolling element with interposition of a halfbush having a portion of a concave inner cylindrical surface complementary to the confronting convex cylindrical surface of the arm, and a portion of a convex outer cylindrical surface complementary to the confronting portion having a concave cylindrical surface of the rolling element, the respective axes of the concave inner cylindrical surface and convex outer cylindrical surface of the halfbush being perpendicular to each other.

In order to ensure its axial maintenance relative to the tripod element, each halfbush comprises two planar guide surfaces parallel to each other and symmetrically spaced apart relative to the axis of the portion of a convex outer cylindrical surface, and perpendicular to the axis of the concave inner cylindrical surface, the planar guide surfaces being cooperative with two opposed radial planar surfaces of the tripod element which are perpendicular to the axis of the driving shaft.

With these various features, the homokinetic joint according to the invention is of a compact design and ensures a precise axial retention of the driving shaft relative to the geometric center of the housing element. The clearances therein are reduced to the strict minimum for allowing the various relative displacements of the components of the joint.

A vehicle wheel is driven by means of such a joint without noise or shocks when the torque is inverted.

This design also permits dispensing with elastically yieldable clearance taking up devices, such as those described and shown in the document FR-B-2 525 306.

Further, this joint permits an operation at an increased flexing angle while conserving the same torque transmitting capacity.

According to other features of the invention, the means forming a joint of the Cardan type permits the pivoting of each rolling element about the radial axis of the corresponding arm of the tripod element and around a concurrent axis parallel to the driving axis. Each arm of the tripod element comprises two portions of opposed axial planar surfaces parallel to the axis of the driving shaft in confronting relation to each of which is disposed a sliding shoe comprising a planar sliding surface which cooperates with the portion of an axial planar surface, a portion of a convex cylindrical surface whose axis is parallel to the sliding planar surface and two opposed transverse surfaces perpendicular to the axis of the portion of a cylindrical surface, a rolling element being disposed in confronting relation to each of the sliding shoes with interposition of a half bush having a portion of a concave inner cylindrical surface complementary to the convex cylindrical surface of the confronting shoe, a portion of a convex outer cylindrical surface complementary to the portion of a confronting concave cylindrical surface of the rolling element, the respective axes of the concave inner cylindrical surface and convex outer cylindrical surface of the half bush being concurrent and perpendicular to each other, and two opposed abutment planar surfaces perpendicular to the axis of said convex outer cylindrical surface of the halfbush, each planar abutment surface being cooperative with a corresponding planar abutment surface formed on the rolling element.

Each halfbush comprises two parallel planar guide surfaces symmetrically spaced apart relative to the axis of the portion of a convex outer cylindrical surface, and perpendicular to the axis of the concave inner cylindrical surface, the planar guide surfaces being cooperative, on one hand, with two opposed radial planar surfaces of the tripod element perpendicular to the axis of the driving shaft and, on the other hand, with the opposed transverse surfaces of the corresponding sliding shoe.

The two halfbushes may be formed by a single annular bush.

The two rolling elements may also be formed by a single annular rolling element.

The two planar abutment surfaces of the rolling element are disposed between the two planar abutment surfaces of the annular bush, one of the planar abutment surfaces being constituted by an annular circlip received in a removable manner in a groove in the convex outer cylindrical surface of the bush.

The two planar abutment surfaces of each rolling element are disposed between the two planar abutment surfaces of the corresponding halfbush.

Each arm of the tripod element comprises a pivot whose axis is perpendicular to the plane of the tripod element and around which the rolling elements are pivotally mounted with interposition of an annular bush rotatively mounted on the pivot and having a convex outer cylindrical surface whose axis is perpendicular and concurrent relative to the axis of the pivot and which is complementary to the confronting concave cylindrical surface portion of the rolling elements.

The annular bush comprises an axial open-ended hollow in which is received the arm of the tripod element and an open-ended bore whose axis is perpendicular and concurrent relative to the axis of the convex outer cylindrical surface, the arm of the tripod element comprising a corresponding open-ended bore, the pivot being received in the bores.

The axial hollow comprises two parallel planar guide surfaces symmetrically spaced apart relative to the axis of the convex outer cylindrical surface and perpendicular to the axis of the bore, the planar guide surfaces being cooperative with two radial and opposed planar surfaces of the arm perpendicular to the axis of the driving shaft.

The length of each inner web of the housing element is axially limited in the direction of the opening of the housing element by a chamfer inclined from the free edge of the opening in the direction of the center of the housing element.

The free edge of the opening of the housing element comprises a curvilinear recess forming a continuous abutment surface defining the maximum angularity of the joint.

The radial arms of the tripod element are connected to the driving shaft by their inner radial ends.

The radial arms of the tripod element are connected to the driving shaft by their outer radial ends.

The radial arms of the tripod element are also interconnected by their inner radial ends.

each radial arm comprises at its outer radial end an axial extension connected to the free edge of an end portion in the shape of a cup of the driving shaft.

The housing element comprises a reinforcing element interconnecting the three inner webs and arranged substantially at the center common to the rolling tracks.

It has been found that, when the homokinetic joint according to the invention operates at its maximum flexing angle, there is an angular operational clearance which has an adverse effect on the good quality of its operation and which may, in particular, produce undesirable noise.

The invention also overcomes this drawback.

For this purpose, the invention proposes a homokinetic joint also in which each arm of the tripod element comprises elastically yieldable means biasing the two rolling elements away from each other in a direction perpendicular to the axis common to the portions of respective concave cylindrical surfaces of the rolling elements and to the axis of the shaft driving the tripod element.

The elastically yieldable means are so designed that the resultant of the forces they exert is contained in a plane passing through the other axis of pivoting of the rolling elements relative to the arm. Consequently, the resultant passes substantially through the point of intersection of the two axes of the Cardan type joint.

According to an embodiment, the elastically yieldable means may be formed by a compression coil spring mounted in a bore in the arm of the tripod element and whose two free ends bias a rolling element placed in confronting relation thereto, the axis of the bore being concurrent with and perpendicular to the other pivot axis.

For the purpose of biasing the two rolling elements away from each other, each of the ends of the spring bear against a bearing region formed in the portion of a concave inner cylindrical surface of the corresponding half bush, the latter transmitting the force to the confronting rolling element.

According to other embodiments, the elastically yieldable means are formed by a spring having a central branch bearing on the free upper radial surface of the arm, each of the ends thereof respectively bearing against a confronting transverse bearing region of a half bush, and two lateral branches, each lateral branch extending from one of the ends of the central branch in a direction substantially perpendicular to the general direction of the central branch so as to be received between two opposed transverse bearing surfaces respectively formed on each of the two half bushes, the free end of the lateral branch being in bearing relation to one of the transverse bearing surfaces. The bearing region being formed on the other of the transverse bearing surfaces.

The spring includes means for maintaining it in position relative to the arm. For this purpose, the free end of each of the lateral branches comprises a lug which is bent substantially at 90° and is cooperative with the confronting lower lateral surface of the half bush against the transverse bearing surface of which the free end bears. As a modification, each of the lateral branches may include in its median part a positioning lug which is received in a notch formed in a confronting portion of the arm. The spring may be made from a folded metal wire or the spring may be made from a folded metal wire or from a cut-out and folded metal sheet.

BRIEF DESCRIPTION OF THE DRAWINGS

Further features and advantages of the invention will be apparent from the following detailed description with reference to the accompanying drawings, in which:

FIG. 15a is a sectional view taken on line 15a-15b of FIG. 14a;

FIG. 21 is an axial sectional view taken on line 21—21 of FIG. 22, of another embodiment of a homokinetic joint shown in its aligned position;

FIG. 22 is a sectional view taken on line 22—22 of FIG. 21;

FIG. 23 is a sectional view taken on line 23—23 of a detail of FIG. 22;

FIG. 24a is a semi-view of the top of the joint shown in FIG. 21;

FIG. 24b is a semi-view similar to 24a including a variant of the rolling elements;

FIG. 25 is a view similar to FIG. 23 corresponding to the variant shown in FIG. 24b;

FIG. 35 is an axial sectional view of a joint having coil springs for taking up clearance in accordance with the teaching of the invention;

FIG. 36 is a sectional view taken on the line 36—36 of FIG. 35;

FIG. 37 is a partial sectional view taken on line 37—37 of FIG. 36;

FIGS. 38, 39, and 40 are partial views similar to FIGS. 35, 36 and 37 showing a second embodiments of a spring according to the teaching of the invention;

FIGS. 41 and 42 are views of the spring shown in FIGS. 38, 39 and 40 in the free state;

FIG. 43 is a view similar to FIG. 40 of the forces applied by the spring;

FIGS. 44, 45 and 46 are views similar to FIGS. 38, 39 and 40 illustrating a third embodiment of the spring;

FIGS. 47, 48 and 49 are views of a fourth embodiment of a spring shown in the free state;

FIGS. 50, 51 and 52 are views similar to FIGS. 47 to 49 of a fifth embodiment of a spring and, FIGS. 53 to 57 are views similar to FIGS. 38 to 42 of a sixth embodiment of a spring.

DESCRIPTION OF THE PREFERRED EMBODIMENTS

Figure 1:
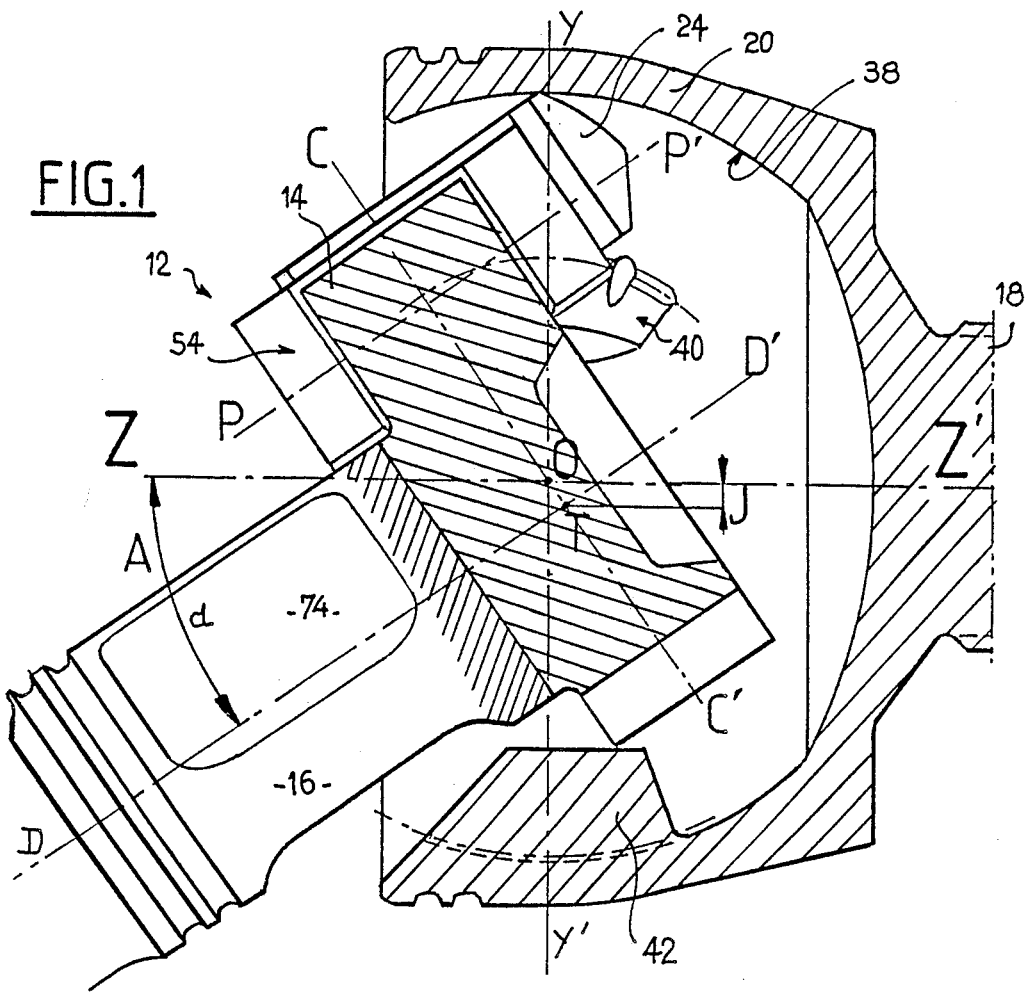
FIG. 1 is an axial sectional view of a joint arranged in accordance with the teaching of the invention and operating at a flexed angle.
Figures 9, 10:
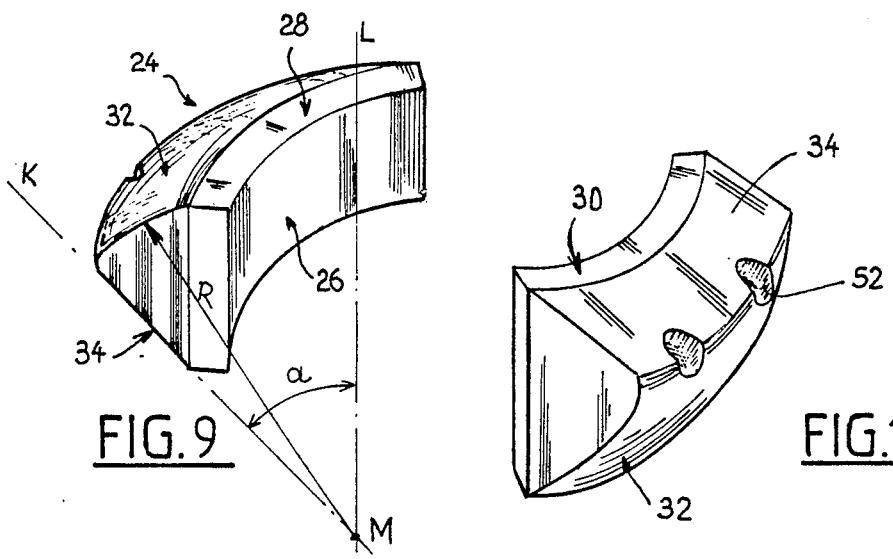
FIG. 9 is a perspective view of a rolling element of the joint shown in FIGS. 1 to 3.
FIG. 10 is a view similar to FIG. 9 of a rolling element which has been turned through 180° in order to show the conical side.

The homokinetic joint 12 shown in FIG. 1 comprises a tripod element 14 mounted on the end of a driving shaft 16 having an axis D-D'. The driving shaft 16 drives in rotation of a driven shaft 18 through the tripod element 14 which cooperates with a housing element in the form of a substantially spherical bowl element centered on the axis Z-Z' of the driven shaft 18.

Figure 7:
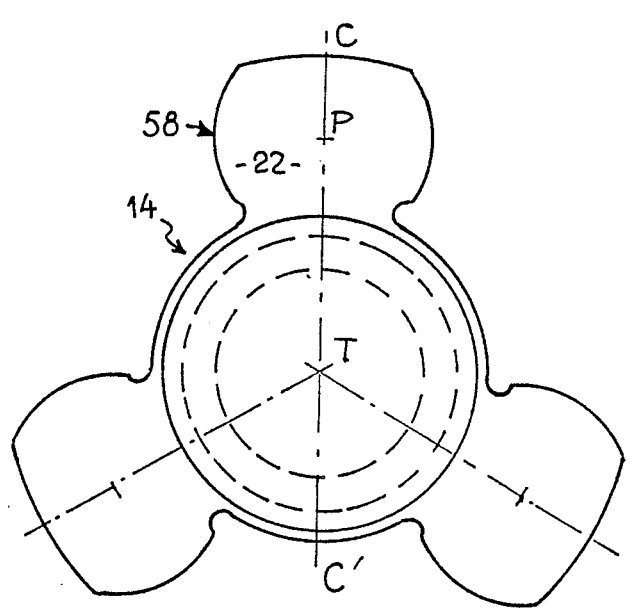
FIG. 7 is a front elevational view of the tripod element of the joint shown in FIGS. 1 to 3.
Figure 8:
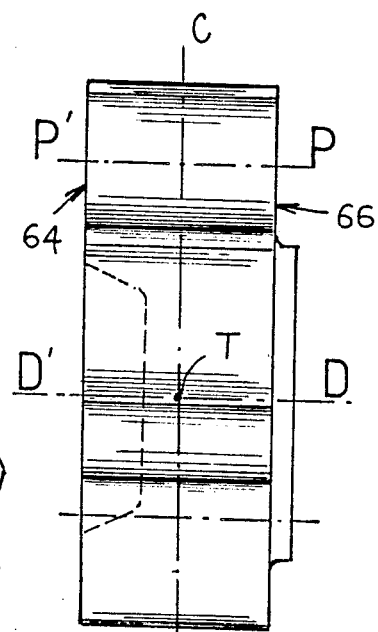
FIG. 8 is a left side elevational view of the joint of FIG. 7.

The tripod element 14 mainly comprises a thick steel plate cut out in accordance with the contour shown in FIGS. 7 and 8. The tripod element 14 comprises three driving arms 22 angularly spaced 120° apart about the axis D-D' common to the tripod element and the driving shaft 16.

In a general way, in its aligned position, i.e when the axes D-D' and Z-Z' are coincident, the joint 12 has a ternary symmetry about its axis of rotation. Consequently, there will be described only the part of the joint associated with a given arm 22 located in the upper part of these figures.

Figure 3:
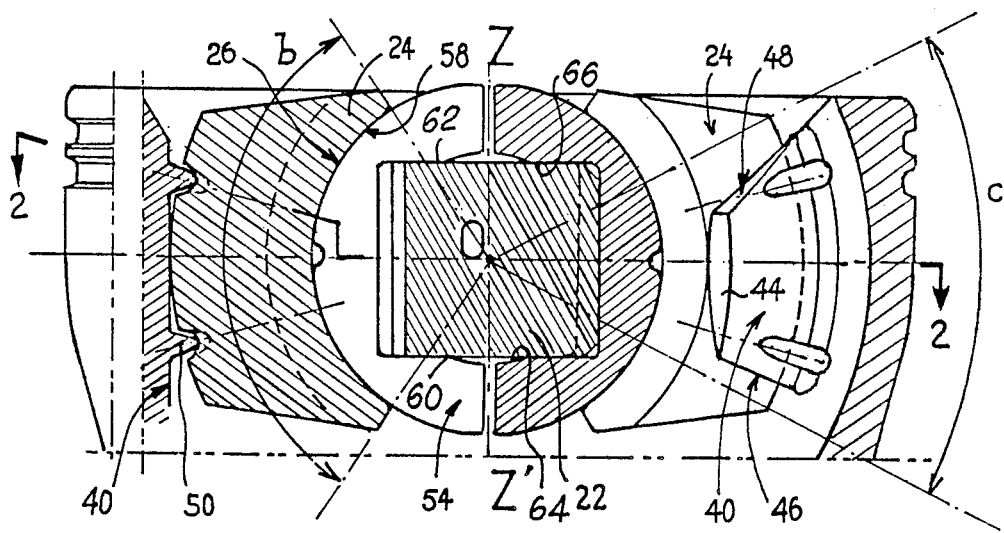
FIG. 3 is a sectional view taken on line 3—3 of FIG. 2.
Figure 2:
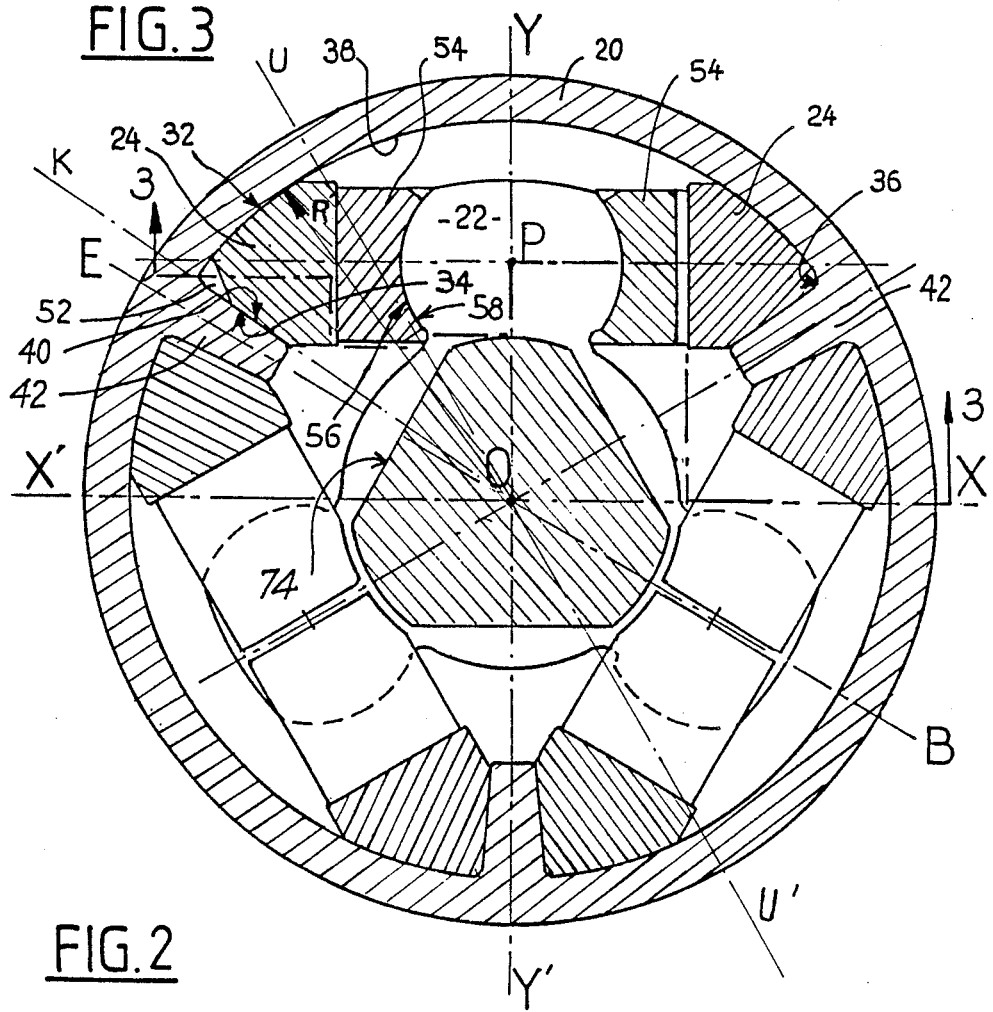
FIG. 2 is a sectional view taken in a radial plane of the joint of FIG. 1 when it is in an aligned or unflexed position, and more precisely a sectional view taken on line 2—2 of FIG. 3.

The considered driving arm 22 has a general radial axis C-C' perpendicular the axis D-D' of the tripod element The arm 22 is provided with two identical rolling elements 24 disposed on opposite sides of the arm 22, i.e. at the left and right of the arm as viewed in FIGS. 2, 3 and 7.

The left rolling element 24 and the corresponding rolling track formed in the spherical housing element 20 will now be described.

As can be seen in FIGS. 2, 3, 9 and 10, the rolling element 24 is constituted by an angular portion of an element having the general shape of an annular segment. It comprises a portion of a concave cylindrical surface having an axis L-M which cooperates with the arm 22 and allows the rolling element to slide axially relative to the axis C-C' of the latter in a manner which will be explained hereinafter. The concave cylindrical surface 26 is axially defined by two confronting flat surfaces 28 and 30 which are perpendicular to the axis L-M.

The rolling element 24 has two concurrent rolling surfaces 32 and 34. The rolling surface 32 is a portion of a spherical surface whose center M is located on the axis L-M of the concave cylindrical surface 26 and whose radius is R. The second rolling surface 34 is a surface having a conical contour which is a portion of the surface of a cone whose apex M coincides with the center of the spherical surface 32 whose axis of rotation coincides with the axis L-M of the concave cylindrical surface 26 and whose semi-angle at the apex M is slightly less than 60°. The concurrent surfaces 32 and 34 may be connected by a rounded portion or a chamfer.

The radial section of a rolling element 24 therefore has a substantially triangular contour having two rectilinear sides and a circular rounded side.

The rolling element 24 cooperates with a rolling track formed in confronting relation thereto in the housing element 20. Each rolling track is formed by two concurrent surfaces 38 and 40.

As can be seen in FIG. 2, the two surfaces 38 and 40 are preferably joined by a rounded region 36.

The surface 38 is formed by the inner spherical surface of the housing element 20 whose center 0 is located on the axis Z-Z' common to the housing element 20 and the driven shaft 18 and whose radius R' is substantially equal to the radius R of the spherical surface 32. The spherical bore of the housing element 20 includes three webs 42 angularly spaced 120° apart about the axis Z-Z'. Each web 42 extends in an axial plane EOB containing the axis Z-Z'. The second surface 40 of the rolling track of the element 24 is formed on the confronting side of the web 42 and is formed in accordance with the invention by a surface having a conical contour which is a portion of the surface of a cone whose apex 0 coincides with the geometric center of the inner spherical surface 38 of the housing element 20, whose axis X-X' is perpendicular to the axis Z-Z' of the driven shaft and to the axial plane containing the axis Y-Y' coincident with the axis C-C' of the arm 22 of the tripod element 16 when the joint is in its aligned position The apex semi-angle KOX' of the cone is slightly larger than the angle of 30°, EOX', formed between the plane EOB of the web 42 and the axis X-X' perpendicular to the axis Y-Y'.

As can be seen in FIG. 3, each web 42 of course has two conical rolling surfaces of the type of surface 40, the axis of the cone defining the second surface 40 of the web 42 which has just been described, being the bisecting axis U-U' of the angle EOY.

The height of the webs 42 is limited for example by a cylindrical bore 44. The length of the webs 42 is limited either by the intersection 46 of the opposed conical surfaces 40 of the web 42 or by a chamfer 48 which faces toward the opening of the housing element 20.

The bottom of the trough-shaped part, formed by the surfaces 40 of the webs 42 and the spherical bore 38 of the housing element is interrupted by transverse teeth 50 employed for achieving an angular indexing of the rolling elements 24 bearing against the sides of the troughs and which cooperate with corresponding indentations 52 formed on the conical rolling surface 34 of each rolling element 24

As can be seen in FIG. 3, the inner cylindrical bearing surface defined by the concave cylindrical surface 26 of each element 24 subtends an angle b which is substantially equal to 120°. The peripheral rolling region which comprises the shaped indentations 52 subtends an angle c of between about 50° and 60°.

There will now be described the means 54 which enable the rolling elements 24 to slide axially relative to the arms 22 and to pivot relative to the latter by means of a joint of the Cardan type.

These means comprise two symmetrical half bushes 54. Each half bush 54 is interposed between a rolling element 24 and one of the sides of the arm 22.

The half bush 54 has a portion of a concave inner cylindrical surface 56 having an axis S-S' which is complementary to a portion of a convex cylindrical surface 58 formed on the confronting side of the arm 22 of the tripod element with which it cooperates to permit a movement of rotation of the bush 54 relative to the arm of the tripod element 22 about the axis P-P' of this arm.

The half bush has a portion of a convex outer cylindrical surface 58 which is complementary to the confronting concave inner cylindrical surface of the rolling element 24 whose axis V-V' is perpendicular and concurrent relative to the axis S-S' of the concave inner cylindrical surface 56 to permit said the joint of the Cardan type.

The concave inner cylindrical surface 56 is defined by two planar guide surfaces 60 and 62 which are parallel to each other and perpendicular to the axis S-S'. The planar surfaces 60 and 62 are spaced apart symmetrically on each side of axis V-V' of the convex outer cylindrical surface 58. The two planar guide surfaces 60 and 62 are provided for cooperation with the two opposed radial planar surfaces 64 and 66 formed on the tripod element and perpendicular to the axis D-D' common to the latter and the driving shaft 16.

Figure 4:
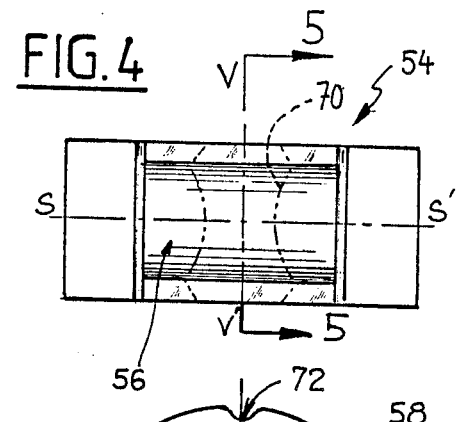
FIG. 4 is a front elevational view of a half bush of the joint shown in FIGS. 1 to 3.
Figure 5:
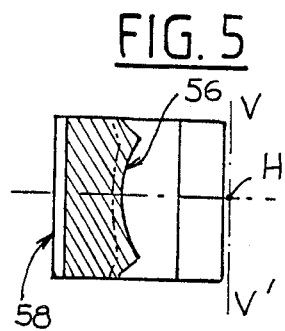
FIG. 5 is a sectional view taken on line 5—5 of FIG. 4.
Figure 6:
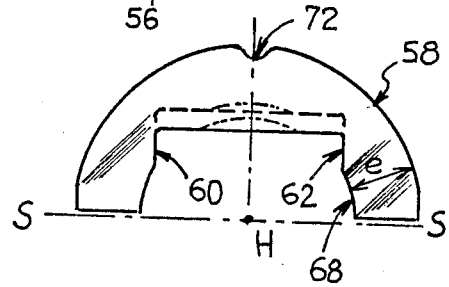
FIG. 6 is a plan view of the half bush of FIG. 4.

The half bush shown in FIGS. 4 to 6 may be obtained by a cold bending and forming of an annealed steel plate. The radial distance e between the outer convex cylindrical surface 58 and a coaxial inner cylindrical clearance surface 68 is substantially equal to the unchanged thickness of the plate blank resulting from the cold forming operation. The central region obtained by forming, which may have a lack of material 70 as shown in dot-dash line in FIG. 4, permits an improved lubrication of the joint and an improved bending adaptability of the convex bearing surface of the journal 58 with the inner concave cylindrical bearing surface 26 of the rolling element 24. One or more axial grooves of the type of groove 72 shown in FIGS. 5 and 6 facilitates the internal supply of lubricating agents.

The driving shaft 16 on which the tripod element 14 is fixed, for example by friction welding, comprises flat surfaces 74 which are angularly spaced 60° apart relative to the axes of the arms 22 of the tripod element. These flat surfaces allow the obtaining of a large flexing angle of the joint without resulting in interference with the ends of the webs 42.

According to the invention, when the joint rotates and irrespective of its flexing angle, the sole possible movement for each of the segments 24 is a rolling movement in its trough, the axis L-M of its concave cylindrical bore 26 being constrained, by geometric design, to pass permanently through the geometric center O of the housing element 20.

Any lateral pivoting movement of the rolling element 24 about axes parallel to the axis P-P' of the convex cylindrical portion 58 of the corresponding arm 22 is completely impossible owing to the continuous and quasitotal contact between the confronting complementary spherical surfaces 32 and 38 and the continual tangency of the generatrices of the conical surfaces 32 and 40 in reciprocal linear contact.

When the homokinetic joint is in its position shown in FIG. 1, the axis D-D' of the driving shaft 16 making an angle d with the axis Z-Z' of the housing element of the driving shaft 18, for example connected to the stub-axle of an automobile vehicle, the geometric center T of the tripod element 14, defined as being the point of intersection of its axis D-D' and the axes C-C' of its three arms, is radially off-center by a distance J relative to the axis Z-Z' of the spherical housing element 20.

It can be seen that, in this position, the rolling elements 24 on the upper arm 22 have slid outwardly relative to the latter in a direction parallel to the axis C-C' and relative to the pivot axis P-P' of the half bushes.

However, it will be observed that the plane of symmetry of the tripod element passing through the axis C-C' always contains the center O of the inner spherical surface 38 of the housing element 20.

Indeed, the spherical bearing surfaces 32 of the rolling elements 24 are in permanent sliding contact with the complementary spherical inner surface 38 of the housing element 20, and, under these conditions, the axis L-M of the inner cylindrical bore 26 of these rolling elements is constrained to pass continually through the general center O. The same is true of the axis V-V' of the convex outer cylindrical bearing surfaces 58 of the half bushes on which the rolling elements 24 are rotatively mounted.

Now, as the pivot axis P-P' of the half bushes 54 on the arm 22 of the tripod element is perpendicular to the plane of symmetry passing through the axis C-C' this plane of symmetry always contains the axis V-V' of the outer convex cylindrical bearing surfaces 58 of the bushes. In conclusion, the plane of symmetry of the tripod element always contains the center O of the spherical housing element irrespective of the direction and intensity of the movement of the orbiting of the tripod element relative to the housing element.

The design of a joint according to the invention just described has the following features:

an axial position of the driving shaft relative to the housing element 20 is obtained which is very exactly geometrically defined without having to use any associated axial retaining device which is often unreliable, costly and results in noise;

the joint operates with no clearance other than the minimum clearance required to permit the lubricated sliding of the confronting active surfaces and there is consequently no risk of noise being produced by the taking up of the axial and circumferential clearances;

when the joint operates at a flexed angle, the orbital motion results in no corresponding axial motion of the shaft;

the angularity of the behavior of each rolling element on its corresponding rolling track is substantially increased relative to the solution of the prior art, and the component parts of the joint are of small size and may be in particular obtained by cold forming operations without requiring complementary subsequent finishing operations.

Without departing from the scope of the present invention, it is in particular possible to modify the values of the semi-angles at the apex of the conical surfaces, for example by increasing the thickness of the webs 42. However, the values indicated with reference to the preferred embodiment of the invention just described are those which permit obtaining the largest dimension of the rolling elements and the largest flexing angle of the joint.

In the following part of the description, the main components which are identical or similar to those described and shown in FIGS. 1 to 10 will be designated by the same reference numerals.

Figure 11:
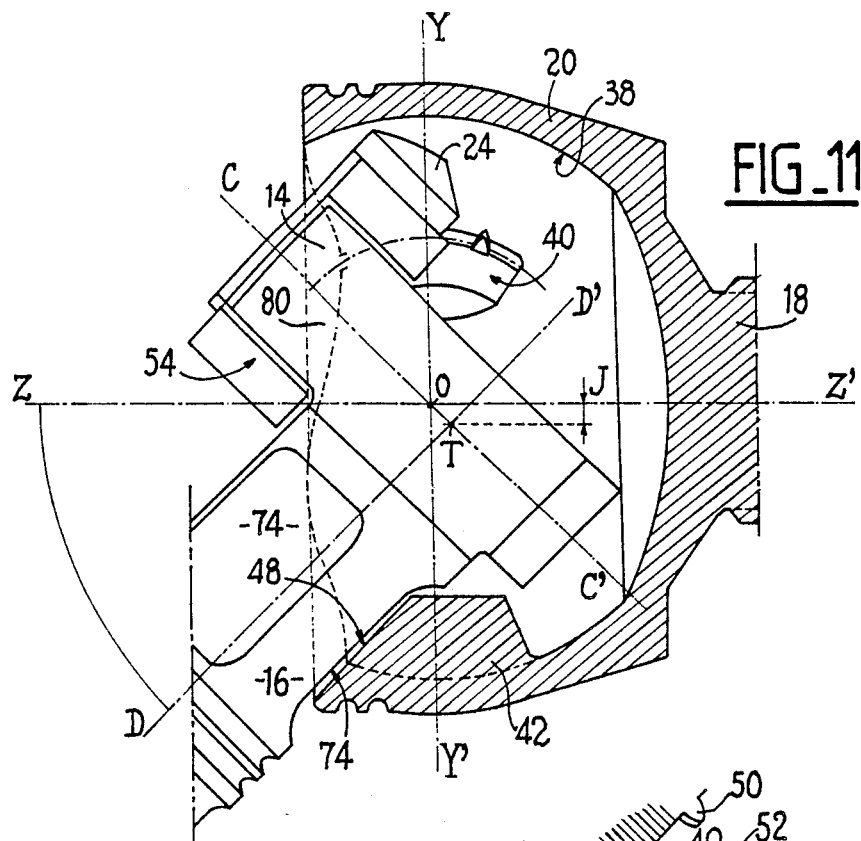
FIG. 11 is an axial sectional view similar to FIG. 1 of a first variant of a homokinetic joint.

As can be seen in FIG. 11, the axial length of the webs 42 is axially limited adjacent to the opening of the housing element 20 by a chamfer 48. The latter is inclined from the free edge of the opening of the housing element toward the center O of the latter. This cooperation of the chamfer 48 with the corresponding flat surface 74 formed on the driving shaft 16 defines the maximum flexing angle of this type of homokinetic joint in which the arms of the tripod element are connected to the driving shaft by their radially inner ends, which results in a very small overall size and reduced weight.

A chamfer 80 is shown in dotted line in FIG. 11 whose depth varies along the free edge of the housing element 20 and whose slope is equal to the maximum flexing angle of the joint.

The modulation of the depth of the chamfer 80 cooperates with the three flat surfaces 74 on the driving shaft 16 to constitute a safety stop which avoids an excessive joint flexing angle. The value of the modulation of the depth of the chamfer 80, which passes through a maximum and a minimum every 120°, is determined at the maximum angularity by the variation in the distance TO in the course of the rotation of the joint.

Figure 12:
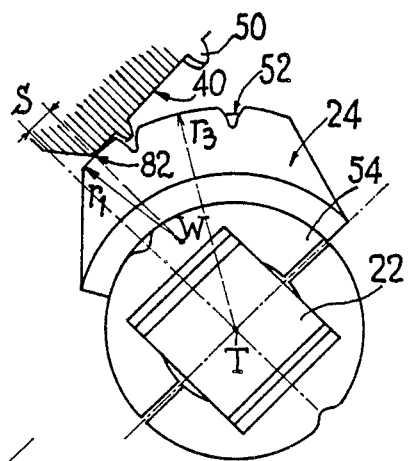
FIG. 12 is a diagrammatic view of the contact cooperation between a rolling element and the end of the corresponding rolling track when the joint such as that shown in FIG. 11 is put at the maximum flexing angle.

FIG. 12 is a diagrammatic illustration of the contact cooperation between the rolling element 24 and the end of the rolling track 40 when the joint is at the maximum flexing angle.

As can be seen in FIG. 12, the axis of rotation T of the rolling element travels beyond the end 82 of the rolling track a distance S, termed the overhang. In order to ensure a correct transfer of the driving force between the rolling element and the rolling track, the two ends of the rolling surface of the element 24 have a radius of curvature r1 centered at a point W which is less than the radius R3 of the rolling surface of their mean section centered at T on the axis of rotation of the rolling element.

Thus, when the rolling elements 24 reach an end angular position, there is tangency between their peripheral rolling surface and the bottom of the end of the corresponding rolling track as shown in FIG. 12.

Figure 13:
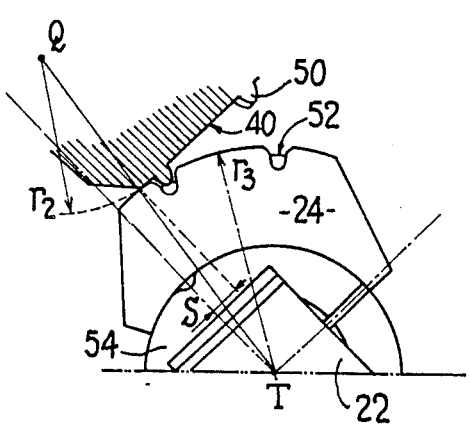
FIG. 13 is a view similar to FIG. 12 of a variant of the contact cooperation.

FIG. 13 shows another embodiment whereby it is possible to ensure the tangency of contact between the ends of the rolling tracks and the peripheral rolling surface of the rolling elements.

In this embodiment, the rolling elements are of revolution and have a constant radius r3. The ends of the bottoms of the rolling tracks 40 are no longer tangent to a plane but to a cylinder having a radius r2 centered at Q corresponding to an overhang of a value S.

Figure 14A:
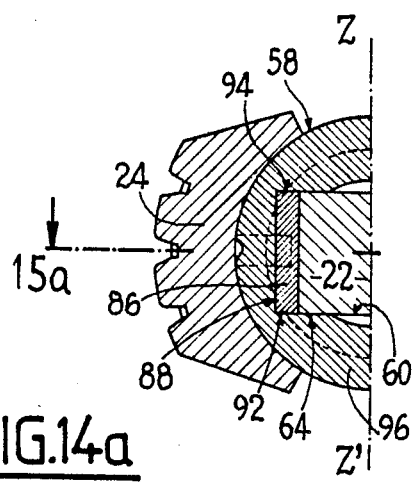
FIG. 14a is a sectional view taken on line 14a-14b of FIG. 15a representing a semi-view of a variant of the joint of the Cardan type.
Figure 15A:
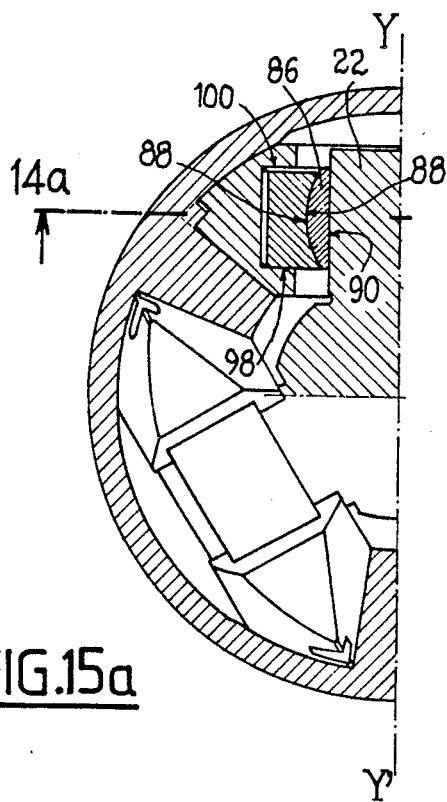

A variant of the universal joint means is shown in FIGS. 14a and 15a.

In this variant, each arm of the tripod element has a rectangular section defined, on one hand, by two opposed axial planar surface portions 84 which are parallel to the axis D-D' of the driving shaft 16 and to the radial axis C-C' of the corresponding tripod element arm and therefore perpendicular to the general plane of the tripod element and, on the other hand, by two opposed and radial planar surfaces 64 and 66 which extend in planes perpendicular to the axis D-D' of the driving shaft.

A sliding shoe 86 is provided which cooperates with each axial planar surface portion 84.

Each sliding shoe comprises a portion of a convex cylindrical surface 88 and a sliding planar surface 90 parallel to the axis of the convex cylindrical surface 88. The planar sliding surface 90 cooperates with the portion of an axial planar surface 84 of the arm 22 of the tripod element. The sliding shoe 86 is transversely defined by two opposed transverse surfaces 92 and 94 which extend in planes perpendicular to the axis of the cylindrical portion 88.

In the embodiment shown in FIGS. 14a and 15a, in which the arms 22 of the tripod element are connected by their radially inner ends, the two rolling elements 24 are mounted as a universal joint on the arm 22 by a single annular bush 96.

The annular bush 96 in fact corresponds to the construction in a single piece of two half bushes of the type of the half bushes 54 described and shown in FIGS. 4 to 6 to which description reference will be made for a detailed description of the geometric conformation of these elements.

The annular bush 96 has two parallel planar guide surfaces 60 and 62 which are symmetrically spaced apart relative to the axis V-V' of the continuous convex outer cylindrical surface 58 of the annular bush. These planar guide surfaces 60 and 62 cooperate, on one hand, with the two opposed radial planar surfaces 64 and 66 of the arm 22 of the tripod element and, on the other hand, with the opposed transverse surfaces 92 and 94 of each of the two sliding shoes 86 so as to guide the sliding movements of the latter on the surfaces 84 and immobilize them relative to the bush in the direction Z-Z'.

The annular bush 96 is radially defined by two opposed planar abutment surfaces 98 and 100 which are perpendicular to the axis of its continuous convex outer cylindrical surface 58. These two planar abutment surfaces are received between two planar abutment side surfaces 102 and 104, respectively.

The cooperation between the abutment surfaces 100 to 104 enables the annular bush 96 to be maintained in a constant position relative to the rolling elements 24 in the radial direction Y-Y' of the arm 22.

Thus, when the joint operates at a flexing angle, the median plane of the rolling elements remains continuously in alignment with the pivot axis of the cylindrical surfaces 88 of the sliding shoes 86 which corresponds to one of the pivot axes of the joint of the Cardan type mounting of the rolling elements on the arm of the tripod element.

Figure 14B:
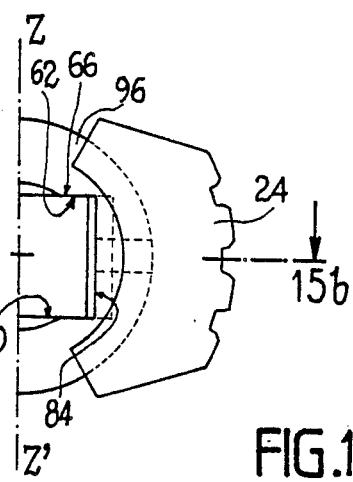
FIG. 14b is a partial sectional view, similar to FIG. 14a, of a variant which differs from the latter in the connecting mode of the arms of the tripod element.
Figure 15B:
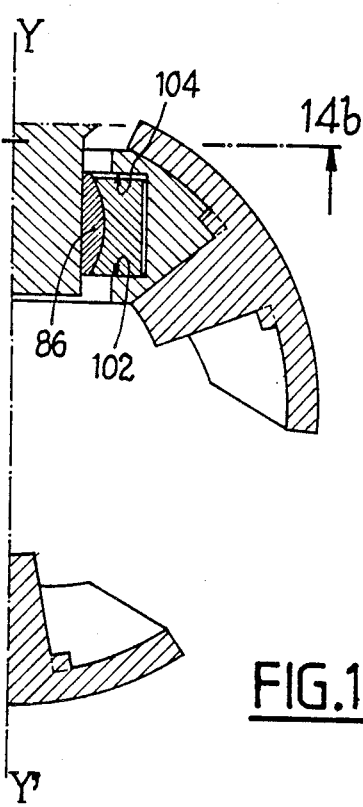
FIG. 15b is a sectional view taken on line 15a-15b of FIG. 14b.

FIGS. 14b and 15b are in every way identical to FIGS. 14a and 15a except for the arms 22 of the tripod element which are connected to the driving shaft by their radially outer ends according to various embodiments, some of which will be described hereinafter.

Figure 16A:
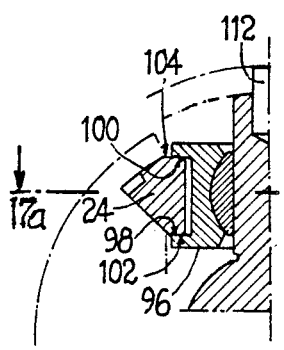
FIGS. 16a, 17a, 16b, and 17b are simplified diagrammatic views, similar to FIGS. 14a to 15b but representing two new variants of the homokinetic joint.
Figure 17A:
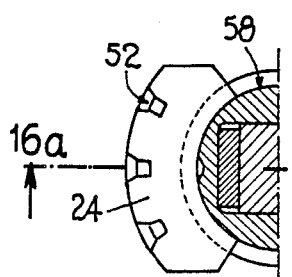

The embodiment shown in FIGS. 16a and 17a is distinguished by the arrangement of the abutment surfaces 98 and 100 of the annular bush 96 which surround the corresponding abutment surfaces 102 and 104 of the rolling elements 24. In this embodiment, the abutment surfaces 98 and 100 are formed by lateral side surfaces of the annular bush 96 which radially project from its outer cylindrical surface 58.

Figure 16B:
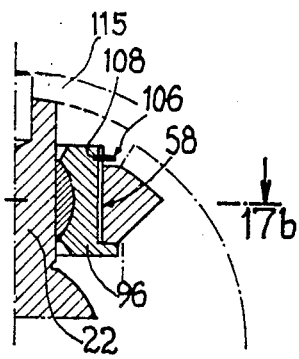
Figure 17B:
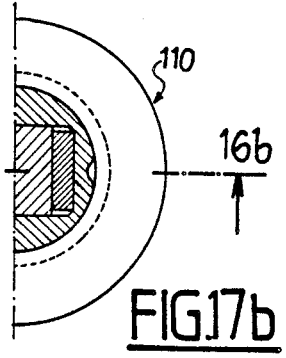

In the embodiments shown in FIGS. 16b and 17b, the upper abutment surface 100 of the annular bush 96 is formed by one of the sides of a detachable circlip 106 received in an annular radial groove 108 formed in the convex outer cylindrical surface 58 of the annular bush 96.

This detachable circlip permits constructing the two rolling elements 24 in the form of a single annular rolling element 110 which permits the mounting of the latter on the single annular bush 96.

As can be seen in FIGS. 16b and 17b, the fact that the two rolling elements 24 may be united into a single annular rolling element 110 permits eliminating the teeth 52 formed on the conical rolling surface 34 and spherical rolling surface 32 of each rolling element 24 and the corresponding teeth 50 previously employed to achieve the angular indexing of the rolling elements 24 bearing against the sides of the troughs.

Diagrammatically shown in the upper part of FIGS. 16a and 16b is a manner of connecting the radial arms 22 of the tripod element by their radially outer ends, each of which is connected by fixing means 112 to an axial element 115 which is connected to the driving shaft 16.

Figure 19:
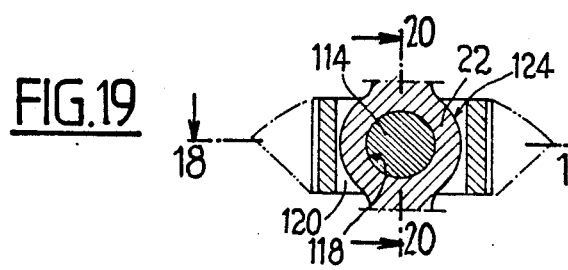
FIGS. 18 to 20 are simplified views of another variant of the universal joint means.
Figure 20:
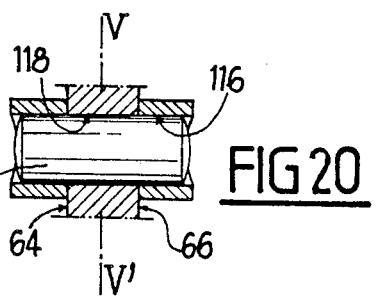
Figure 18:
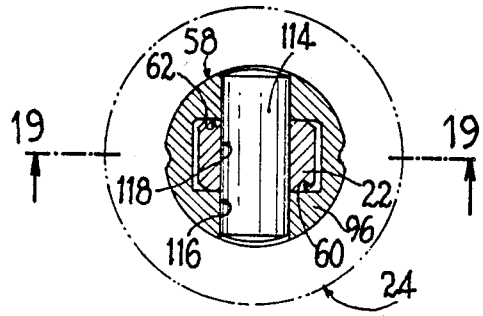

FIGS. 18 to 20 show another embodiment of the joint of the Cardan type according to the invention.

This embodiment is somewhat similar to that of FIGS. 1 to 10 in which the rolling elements are slidable relative to the bushes 54 in a direction parallel to the direction C-C' or Y-Y'. However, the embodiment shown in FIGS. 18 to 20 permits the use of a single annular bush 96.

The rolling elements 24 are diagrammatically represented in the Figures only by a dot-dash line. Each arm 22 of the tripod element comprises a pivot pin 114 which is received, on one hand, in a first open-ended bore 116 formed in the annular bush 96 and, on the other hand, in a second openended bore 118 formed in the arm 22 of the tripod element.

The axis of the pivot pin 114 is perpendicular to the plane of the tripod element 14 to permit a pivoting movement of the annular bush relative to the latter which is similar to that of the two previously-described half bushes 54.

The annular bush 96 is provided with an open-ended axial bore 120 in which the arm 22 of the tripod element is received. The axis of the bore 118 is perpendicular and concurrent relative to the axis V-V' of the convex outer cylindrical surface 58 of the bush. The axial bore 120 includes two parallel planar guide surfaces 60 and 62 which are symmetrically spaced apart relative to the axis V-V', cooperate with two opposed radial planar surfaces 64 and 66 of the arm 22 and extend in a direction perpendicular to the driving shaft 16.

The lateral and opposed surfaces 124 and of the arm of the tripod element which are parallel to the axis of the driving shaft 16 have a cylindrical contour to permit the pivoting of the annular bush 96.

FIGS. 21 to 25 show two variants in which the tripod element 14' is driven in rotation by the driving shaft to which it is connected by radially outer ends of its arms 22. Axial extensions 117 bent axially at 90°, of each of the arms 22 are fixed by any known mechanical means to a cup-shaped end portion 124 of the driving shaft 16.

In this embodiment, the radial arms 22 of the tripod element 14' are also interconnected by a central connection portion 126 which reinforces the structure of the tripod element 14'.

The arms 22 carry convex cylindrical pivoting surfaces 56 of the type described with reference to FIGS. 1 to 10 which permit the pivoting of the two half bushes 54. The rolling elements 24 may be made in the form of a single annular element 110 (FIGS. 21, 22, 23 and 24a) owing to the manner of connecting the arms 22 by their radially outer ends. As a modification, they may also be constructed in the form of two rolling elements 24 (FIGS. 24b and 25). In this case, the rolling elements 24 of course include indexing teeth 52.

The housing element in the shape of a tulip 20 comprises rolling tracks whose contour, which is complementary to that of the rolling elements 24 or 110, conforms to that described and shown in FIGS. 1 to 10.

Clearances 126 are provided in the rear part of the tulip element 20 to facilitate the machining of the rolling tracks 32 and 40.

The axial extensions 117 of the arms 22 may be connected to the free edge 128 of the cup-shaped portion 124, for example by welding, as shown in FIGS. 24a and 24b.

Shown in dot-dash lines in FIG. 21 are the positions occupied by the tripod element and the rolling elements when the joint is operating at its maximum flexing angle which, in this embodiment, is particularly large and on the order of 55°.

This maximum angle of 55° is made possible by the absence of an inner driving shaft connected to the tripod element. Consequently, the limitation of the maximum flexing angle due to interference of the outer peripheral wall of the driving shaft with the ends of the webs of the housing element 20 (FIGS. 1 to 10 and 11 to 13) is in this way avoided.

The blank of the tripod element 14 shown in FIGS. 11 to 14 may be produced very cheaply by blanking and cold forming.

Figure 26:
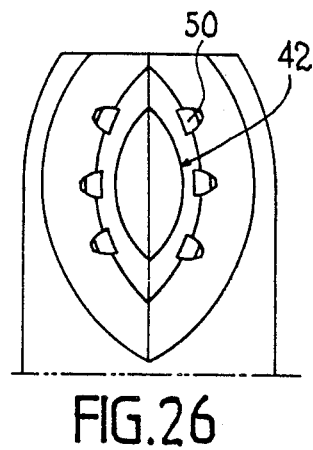
FIG. 26 is a view of one of the webs of the housing element of FIGS. 21 and 22.

FIG. 26 shows the rolling tracks of a web 42 provided with indexing teeth and viewed from the interior.

Figure 28:
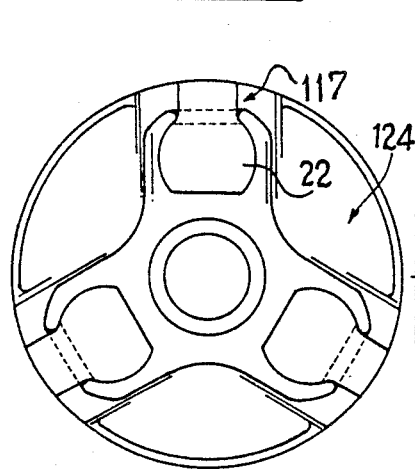
FIG. 28 is a view in the direction of arrow F of FIG. 27 of the tripod element connected to the driving shaft.
Figure 27:
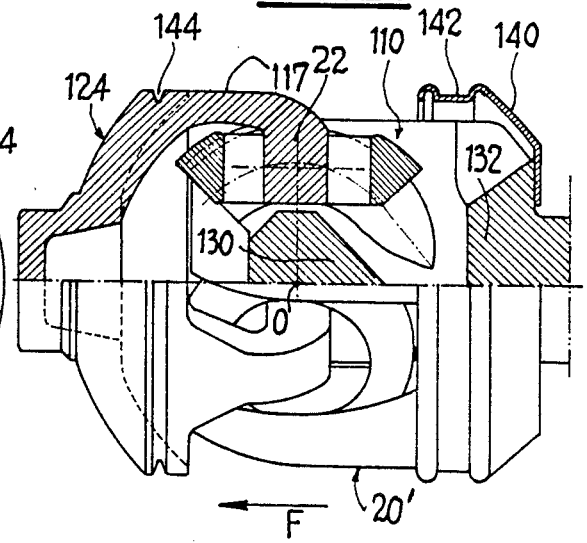
FIG. 27 is a view similar to FIG. 21 of another embodiment of the homokinetic joint according to the invention.
Figure 29:
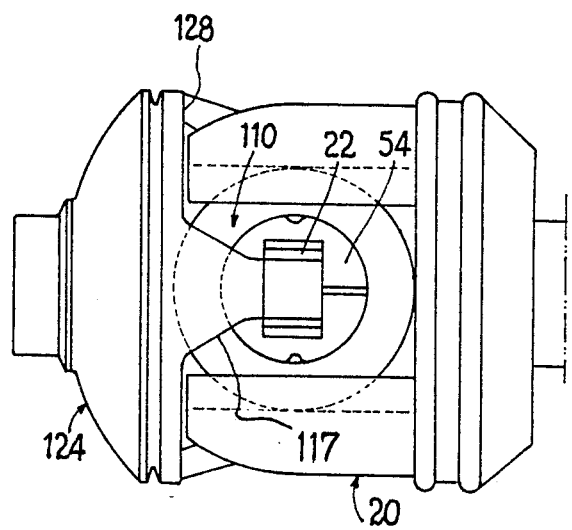
FIG. 29 is a plan view of the homokinetic joint shown in FIG. 27.
Figure 32:
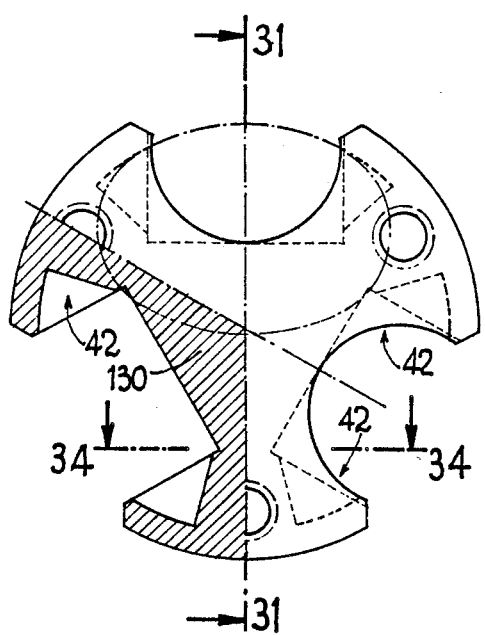
FIG. 32 is a sectional view taken on line 32—32 of FIG. 31.
Figure 31:
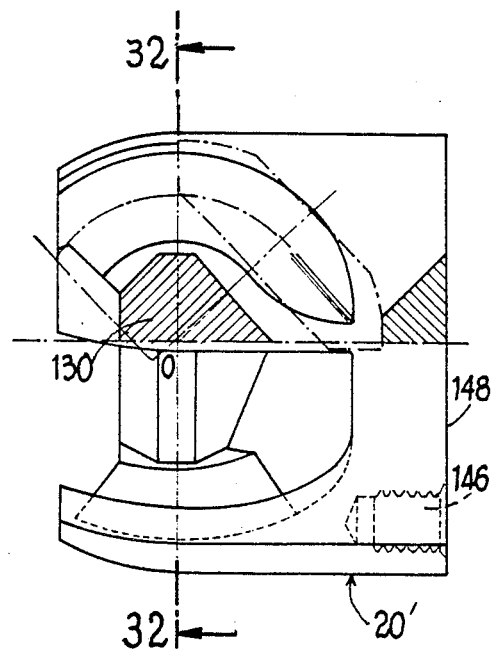
FIG. 31 is an axial sectional view taken on line 31—31 of FIG. 32 of another embodiment of the element in the shape of a tulip in which the rolling tracks are provided.

FIGS. 27 to 29 show another embodiment of the joint in which the arms 22 of the tripod element are connected to the cup-shaped portion 124 of the driving shaft by axial extensions 117 connected at their radially outer ends. The tripod element has no strengthening hub similar to the central portion 126 of the embodiment shown in FIGS. 11 and 12.

The embodiment shown in FIGS. 27 to 29 is also characterized in that the tulip element 20' includes a strengthening element 130 interconnecting the three inner webs 42 of the tulip element 20' and arranged substantially at the center O common to the rolling tracks.

The strengthening element 130 constitutes an inner bridge interconnecting the three webs 42 which permits very considerably increasing the strength of the tulip element whose inner end 132 may be considerably lightened in contrast to that of the tulip element shown in FIG. 21.

In this embodiment, the annular rolling elements 110 and the bushes 54 are carried by the radially inner ends of the tripod element 14' in overhanging relation, these ends constituting the arms 22.

Figure 30:
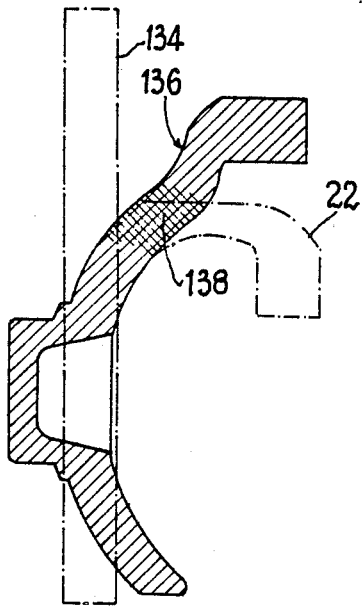
FIG. 30 is a view of the various steps of a method for constructing the tripod element shown in FIG. 28.

The single member constituted by the cup-shaped portion 124, the axial extensions 117 and the arms 22 may be produced simply and cheaply, as diagrammatically shown in FIG. 30.

In starting with a planar steel plate 134 (shown in dot-dash lines), it is possible to blank out or cut out the axial extensions 117 and arms 22 and then effect a forming operation to obtain the blank 136 shown in full lines.

The final shaping of the single member is obtained by bending the portion 138 of the blank 136 shown in double cross-hatched lines in FIG. 30.

A cap of sheet metal or plastics material 140, mounted by elastic deformation on the tulip element 20', allows the fixing of an elastically yieldable sealing bellows or gaiter (not shown) in a radial groove 142 in the cap and in a corresponding radial groove 144 in the cup-shaped member 124.

FIGS. 31 to 34 show another embodiment of the tulip element comprising an inner central strengthening element 130 interconnecting the webs 42.

In this embodiment, the tulip element 20' may be connected to the driven shaft, for example by three bolts (not shown) screwed in tapped holes 146 in the planar rear side of the tulip element 20'.

Figure 34:
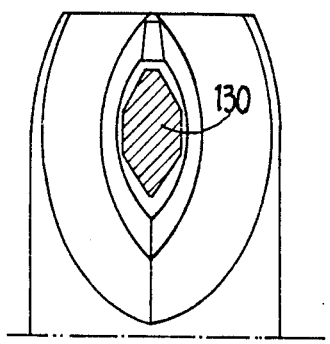
FIG. 34 is a sectional view taken on line 34—34 of FIG. 32.
Figure 33:
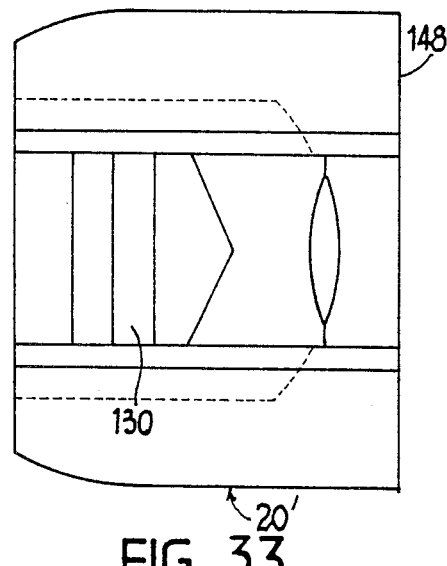
FIG. 33 is a plan view of the part shown in FIG. 31.

FIG. 34 is a sectional view of the bridge portion 130 strengthening the petal portions 42.

For designating the main components of the homokinetic joint shown in FIGS. 35 to 37, the same reference numerals as before have been used. However, in order to render the description of the invention more clear, the two rolling elements provided on the arms 22 of the tripod element 14 are designated by the reference numerals 24a and 24b, the two corresponding half bushes having the reference numerals 54a and 54b.

The rolling elements 24a and 24b are pivotally mounted on the arms 22 by a joint of the Cardan type which enable them to pivot about a first axis Y-Y' and about a second axis P-P' which is concurrent and perpendicular relative to the axis Y-Y'.

According to the invention, elastically yieldable means are provided for biasing the rolling elements 24a and 24b away from each other in a direction L-L' perpendicular to the axis Y-Y'.

In FIGS. 35 to 37, the elastically yieldable means are formed by a compression coil spring 200 freely mounted in a cylindrical bore 202 of the arm 22 of the tripod element 14. The axis of the bore 202 is concurrent and perpendicular relative to the axis P-P' of the pivoting of the rolling elements 24a and 24b and coincident with the direction L-L' in which the resultant of the forces it exerts on the rolling elements 24a and 24b is applied.

Each of the two free ends 204 and 206 of the spring 202 bears against a bearing region 208 and 210 respectively formed in the portion of a concave inner cylindrical surface of the half bush 24a and 24b respectively.

Each bearing region 208, 210 has a hollow shape complementary to that of the spring 202 so as to maintain the latter in position.

Owing to the force exerted thereon by the spring 200, the half bushes 54a and 54b bias the rolling elements 24a and 24b away from each other and consequently ensure that they are positively maintained in position without clearance when the joint operates at its maximum flexing angle.

Although it is reliable and effective, the first embodiment of the elastically yieldable means just described with reference to FIGS. 35 to 37 requires the provision of bores 202 in the arms of the tripod element and the machining of the bearing regions 204 and 206 in the half bushes and results in a reduction in the pivotal bearing surface of the half bushes on the arm of the tripod element.

In order to overcome these drawbacks and to provide a particularly simple and cheap solution, a second embodiment of the elastically yieldable means, shown in FIGS. 38 to 43, is proposed.

In these Figures, the spring 200 is a bent spring wire which compensates for the clearance while avoiding a special machining of the arms of the tripod element and bush and conserving the whole of the pivotal bearing surface of the half bushes on the arm 22.

The spring 200 has a central branch 212 and two lateral branches 214 and 216.

The central branch 212 bears against the free upper radial surface 218 of the arm 22.

The first lateral branch 214 extends from a first end 220 of the central branch 212 in a direction substantially perpendicular to the general direction of the latter so as to be received between two opposed transverse bearing surfaces 222b and 224a respectively formed on each of the half bushes 54a and 54b.

The lateral branch 216 extends symmetrically from the second end 226 of the central branch 212 between two opposed transverse bearing surfaces 222a and 224b respectively formed on each of the two half bushes 54a and 54b.

The first end 220 of the central branch 212 bears against a confronting transverse bearing region constituted by the transverse bearing surface 222b of the half bush 54b. The lower end 228 of this first lateral branch 214 bears against the lateral bearing surface 224b opposite the surface 222b.

The second end 226 of the central branch 212 bears symmetrically against a bearing region constituted by the transverse bearing surface 222a of the half bush 54a. The free end 230 of the second lateral branch 216 bears against the transverse bearing surface 224b of the half bush 54b opposite the surface 222a.

As can be seen in particular in FIG. 39, each of the lateral branches 214, 216 has a bend 232 and 234 respectively projecting toward the interior of the spring so as to maintain the latter in position relative to the arm 22 in the direction P-P' owing to the cooperation of these bends with the confronting sides 64 and 66 of the arm 22.

In order to ensure that the spring 200 is maintained in position relative to the arm 22 in the direction Y-Y', the free end 228, 230 of each of the lateral branches 214, 216 has a lug 238 and 240 respectively bent substantially at 90° and cooperating with the confronting lower lateral surface 242a and 242b respectively, of the half bush against the transverse bearing surface 224a, 224b of which the corresponding free end 228, 230 bears.

As will be easily understood from a comparison of the outline of the spring 200 in the free state, as shown in FIGS. 41 and 42, with its outline in the mounted and compressed state, as shown in FIGS. 38 to 40 the spring 200 exerts on the two half bushes 54a and 54b, and therefore on the rolling elements 24a and 24b, forces F1 and F3 respectively at the top and bottom on the bush 54a, and forces F2 and F4 respectively at the top and bottom on the bush 54b which are of equal magnitude and whose resultants are centered along the direction L-L'.

The central branch 212 of the spring 200 whose direction is substantially parallel to the axis P-P' is subjected mainly to torsional stress whereas the two lateral branches whose directions are substantially parallel to the axis Y-Y' are subjected to bending stress. The connection between the central branch and the lateral branches is in the form of two bends of large radii, in order to reduce the bending/torsional stresses in these bends.

The spring is moreover perfectly maintained in position relative to the arm 22 with no special machining of the latter or of the half bushes 54a or 54b while it is nonetheless easily removable.

The third embodiment of the spring 200 shown in FIGS. 44 to 46 is similar to the second embodiment shown in FIGS. 38 to 43, this spring being constructed from a bent wire of flattened section.

In the fourth embodiment of the spring shown in FIGS. 47 to 49, the spring 20o is a spring made from a blanked out and bent sheet of metal whose structure and positioning are in every way identical to those of the spring shown in FIGS. 38 to 46.

The fifth embodiment of the spring 200 shown in FIGS. 49 to 52 differs from the preceding spring solely in the shape of its upper branch 212 which is bent in such manner as to extend in a plane substantially parallel to the free upper surface 218 of the arm 22 on which it bears.

The last embodiment of a spring composed of a blanked out and bent sheet of metal shown in FIGS. 53 to 57 differs mainly from the preceding springs by the means for maintaining it in position relative to the arm 22 in the direction Y-Y'.

In this embodiment, each of the lateral branches 214, 216 has a lug 244 and 246 respectively, which projects from the median part of each of the branches toward the interior of the spring.

Each of the lugs 244, 246 is received in a recess of corresponding section 248, 250 respectively formed in the sides 64, 66 of the arm 22.

The upper branch 12 has an S shape and bears against the upper radial surface 218 of the arm 222.

Lugs 238 and 240 may be placed in position by two means:

either by introducing between the surfaces 222a and 224b, on one hand, and 224a and 222b, on the other, the bushes 54a and 54b;

or, after elastically spreading apart the lateral branches until the distance between the lugs 238 and 240 exceeds the outside diameter of the bushes; this manner of assembling permits the use of longer lugs.

The spring according to the invention has two other advantages:

It permits an easy disassembly of the joint. Indeed, when the joint is at the maximum flexing angle and the elastically yieldable means is compressed, sufficient clearance is produced to permit the disengagement of the indexing teeth of the segments whose height has been limited for this purpose. The segments can therefore be removed and the joint disassembled.

Further, it damps the shocks and eliminates the percussion noise in the event of a sudden reversal of the torque. Indeed, the spring moves the unloaded surface 58 of the tush away from the cylindrical pivotal surface 56 of the tripod element and allows the lubricant to fill the clearance. Upon a sudden reversal in the torque, the sudden loading of these two surfaces cannot produce a percussion owing to the considerable forces of viscosity developed in the film of oil, as it is crushed (in accordance with a technique proposed in the French patent application No. 86 17550).

I claim:

1. A homokinetic transmission joint, comprising:

a tripod element for connection to a driving shaft, said tripod element having an axis of rotation and three radial arms having radial axes spaced 120° apart;

each said arm having two rolling elements mounted thereon on opposite sides thereof;

a housing element, for connection to a driven shaft, having an axis of rotation and a rolling track for cooperation with each said rolling element;

each said rolling track comprising two rolling track surfaces, a first said rolling track surface comprised of a first spherical surface defined on an inner wall of said housing element and having a center of curvature located on said axis of rotation of said housing element, and a second said rolling track surface comprises of a first conical surface defined by an inner web of said housing element, said inner web extending in a plane containing said axis of rotation of said housing element, and said first conical surface being a portion of a cone, said cone having an apex coincident with said center of curvature of said first spherical surface, said cone having an axis perpendicular to said axis of rotation of said housing element and perpendicular to an axial plane containing the radial axis of said arm cooperating with said rolling track with its respective said rolling elements, and said cone having an apex semi-angle substantially equal to 30°;

each said rolling element having a concave cylindrical surface for cooperation with a respective said arm to enable said rolling element to slide axially relative to said radial axis of said arm, and two adjacent rolling surfaces, said two adjacent rolling surfaces comprising a second spherical surface having a center of curvature located on the cylindrical axis of said concave cylindrical surface of said rolling element and a radius equal to the radius of said first spherical surface of the respective said rolling track, and a second conical surface, said second conical surface being a portion of a cone having an apex coincident with said center of curvature of said second spherical surface, said cone having an axis coincident with said cylindrical axis of said concave cylindrical surface of said rolling element, and said cone having an apex semi-angle substantially equal to 60°; and a mans for pivotally mounting each said rolling element relative to its respective said arm.

2. The joint as set forth in claim 1, wherein said means for pivotally mounting comprises:

two opposed convex cylindrical surfaces on each arm of said tripod element, said two opposed convex cylindrical surfaces having a common axis perpendicular to the plane of said tripod element, one said rolling element being disposed in confronting relation to each respective said opposed cylindrical surface;

a half bush interposed between each said rolling element and its respective said opposed cylindrical surface, each said half bush having a concave inner cylindrical surface complementary to a corresponding confronting said convex cylindrical surface of a said arm and a convex outer cylindrical surface complementary to a confronting said concave cylindrical surface of a respective said rolling element, the axes of said concave inner cylindrical surface and said convex outer cylindrical surface of each said half bush being perpendicular to each other and intersecting each other.

3. The joint as set forth in claim 2, wherein:

each said half bush has two planar guide surfaces parallel to each other, symmetrical with respect to the axis of said convex outer cylindrical surface of said half bush and perpendicular to the axis of said concave inner cylindrical surface of said half bush; and said tripod element has two opposed radial planar surfaces perpendicular to said axis of rotation of said tripod element in confronting relation to and cooperative with said planar guide surfaces.

4. The joint as set forth in claim 2, wherein:

each said arm of said tripod element comprises elastically yieldable means for biasing the two said rolling elements away from each other in a direction perpendicular to the axes of said concave cylindrical surfaces of said rolling elements and perpendicular to said axis of rotation of said tripod element;

each said arm has a bore therethrough; and said elastically yieldable means comprises a compression coil spring mounted in each said bore of said arms, each free end of said coil spring biasing a respective said rolling element, said rolling elements being arranged in confronting relation to said free ends of said coil spring, and the axis of said bore in each said arm intersecting and being perpendicular to a pivot axis of said means for pivotally mounting; and said concave cylindrical surface of each said half bush having thereat a bearing region, said free ends of said coil spring bearing against respective said bearing regions of said concave cylindrical surfaces of said half bushes.

5. The joint as set forth in claim 2, wherein:

each said arm of said tripod element comprises elastically yieldable means for biasing the two said rolling elements away from each other in a direction perpendicular to the axes of said concave cylindrical surfaces of said rolling elements and perpendicular to said axis of rotation of said tripod element;

each said arm has a free outer radial surface;

each said half bush has two transverse bearing surfaces thereon such that each pair of said half bushes forms two sets of two opposed transverse bearing surfaces, each said half bush having one said transverse surface defining a transverse bearing region; and said elastically yieldable means comprises a spring having a central branch and two lateral branches, said central branch bearing against said free outer radial surface of its respective said arm, each end of said central branch confronting and bearing against a respective said transverse bearing region of a said half bush, and each said lateral branch extending from one said end of said central branch in a directions substantially perpendicular to said central branch so as to be received between a said set of two opposed transverse bearing surfaces of said pair of half bushes, a free end of each said lateral branch being in bearing relation to one of said transverse bearing surfaces of a said set, and said transverse bearing region being on the other of said transverse bearing surfaces of a said set.

6. The joint as set forth in claim 5, wherein: each said spring has means for maintaining said spring in position relative to its respective said arm.

7. The joint as set forth in claim 6, wherein said means for maintaining comprises:
a lug on the free end of each said lateral branch bent substantially 90° relative to said lateral branch, said half bush having said transverse bearing surface on which said free end of said lateral branch bears having a confronting radially inner lateral surface, said leg cooperating with said radially inner lateral surface.

8. The joint as set forth in claim 6, wherein:
each said arm has a recess adjacent each said lateral branch of said spring; and
each said lateral branch of said spring has a positioning lug thereon for receipt in a respective said recess.

9. The joint as set forth in claim 5, wherein: said spring is a bent spring metal wire.

10. The joint as set forth in claim 5, wherein: said spring is a cut and bent sheet of metal.

11. The joint as set forth in claim 1, wherein said means for pivotally mounting each said rolling element relative to its respective said arm comprises:
a pivot on each said arm, each said pivot having an axis perpendicular to the plane of said tripod element;
an annular bush rotatively mounted on said pivot, said annular bush having a convex outer cylindrical surface, said convex outer cylindrical surface having an axis perpendicular to and intersecting with said axis of said pivot and being complementary to said concave cylindrical surface of said rolling elements, wherein said annular bush is interposed between a said arm of said tripod element and its respective said rolling elements.

12. The joint as set forth in claim 11, wherein:
said annular bush has an axial opening for receiving a said arm of said tripod element and a bore having an axis perpendicular to and intersecting with said axis of said convex outer cylindrical surface of said annular bush;
each said arm of said tripod element has a bore therethrough corresponding to said bore of said annular bush; and
said pivot is received in both said bores.

13. The joint as set forth in claim 12, wherein:
said axial opening of said annular bush has two planar guide surfaces parallel to each other, symmetrical relative to said axis of said convex outer cylindrical surface of said annular bush, and perpendicular to the axis of said bore of said annular bush; and
each said arm of said tripod element has two opposed radial planar surfaces perpendicular to said axis of rotation of said tripod element, said planar guide surfaces of said axial opening of said annular bush being cooperative with said two opposed radial planar surfaces of said arm.

14. The joint as set forth in claim 1, wherein:
said means for pivotally mounting each said rolling element relative to its respective said arm enables each said rolling element to pivot about the radial axis of its corresponding said arm of said tripod element and around an axis parallel to said axis of rotation of said tripod element.

15. The joint as set forth in claim 14, wherein said means for pivotally mounting comprises:
two opposed axial planar surfaces parallel to said axis of rotation of said tripod element on each said arm of said tripod element;
a sliding shoe in confronting relation to each said axial planar surface of each said arm of said tripod element, each said sliding shoe having a planar sliding surface for cooperating with a said axial planar surface of a said arm, a convex cylindrical surface which has an axis parallel to said planar sliding surface, and two opposed transverse surfaces perpendicular to said axis of said convex cylindrical surface of said sliding shoe; and
a half bush interposed between each said rolling element and a respective said sliding shoe, each said half bush comprising an inner concave cylindrical surface complementary to a confronting said convex cylindrical surface of said sliding shoe, a convex outer cylindrical surface complementary to a confronting said concave cylindrical surface of a said rolling element, the respective axes of said concave inner cylindrical surface of said half bush and said convex outer cylindrical surface of said half bush are perpendicular to each other and intersect each other, and two opposed planar abutment surfaces perpendicular to the axis of said convex outer cylindrical surface of said half bush, wherein each said rolling element has planar abutment surfaces thereon for cooperation with corresponding said opposed planar abutment surfaces of a respective said half bush.

16. The joint as set forth in claim 15 wherein:
each said half bush has two planar guide surfaces parallel to each other, symmetrical relative to said convex outer cylindrical surface of said half bush, and perpendicular to the axis of said concave inner cylindrical surface of said half bush; and
said tripod element has two opposed radial planar surfaces perpendicular to said axis of rotation of said tripod element, wherein said planar guide surfaces of said half bush are cooperative with said radial planar surfaces of said tripod element and said opposed transverse surfaces of the corresponding said sliding shoe.

17. The joint as set forth in claim 15, wherein:
said half bushes of each said arm are integral with each other, forming a single annular bush on each said arm.

18. The joint as set forth in claim 15, wherein:
said planar abutment surfaces of each said rolling element are disposed between said planar abutment surfaces of their corresponding said half bush.

19. The joint as set forth in claim 15 wherein:
each said radial arm of said tripod element has a radially outer end, said radial arms being connected to the driving shaft by said radially outer ends.

20. The joint as set forth in claim 19, wherein:
each said radial arm of said tripod element has a radially inner end, said radial arms being interconnected at their radially inner ends.

21. The joint as set forth in claim 19, wherein:
the driving shaft has a cup-shaped end portion having a free edge, each said radial arm having an axial extension at its radially outer end connected to said free edge of said cup-shaped end portion.

22. The joint as set forth in claim 19, wherein:

said housing element has a strengthening element interconnecting said inner webs, said strengthening element being disposed substantially at the center of said rolling tracks.

23. The joint as set forth in claim 15, wherein:

said half bushes of each said arm are integral with each other, forming a single annular bush on each said arm, said single annular bush having a groove in said convex outer cylindrical surfaces of its said half bushes;

said planar abutment surfaces of each said rolling element are disposed between said planar abutment surfaces of said half bushes forming said single annular bush; and one of said planar abutment surfaces of said half bushes forming said single annular bush is defined by a detachable annular circlip received in said groove of said single annular bush.

24. The joint as set forth in claim 14, wherein:

said radial arms of said tripod element each have radially inner ends, and are connected to the driving shaft by said radially inner ends.

25. The joint as set forth in claim 24, wherein:

said housing element has an open end and a free edge at said open end, said free edge having a curvilinear outline defining a continuous abutment surface, said continuous abutment surface defining the maximum flexing angle of said joint.

26. The joint as set forth in claim 14, wherein:

said housing element has an open end and a free edge at said open end; and each said inner web of said housing element is axially delimited in the direction of said open end of said housing element by a chamfer inclined from said free edge of said housing element toward the center of said housing element.

27. The joint as set forth in claim 1, wherein:

each said arm of said tripod element comprises elastically yieldable means for biasing the two said rolling elements away from each other in a direction perpendicular to the axes of said concave cylindrical surfaces of said rolling elements and perpendicular to said axis of rotation of said tripod element.

28. The joint as set forth in claim 27, wherein:

a resultant of forces due to said elastically yieldable means is contained in a plane which passes through the pivot axis of said means for pivotally mounting each said rolling element relative to its respective said arm.

29. The joint as set forth in claim 28, wherein:

each said arm has a bore therethrough; and said elastically yieldable means comprises a compression coil spring mounted in said bore of said arms, each free end of said coil spring biasing a respective said rolling element, said rolling elements being arranged in confronting relation to said free ends of said coil spring, and the axis of said bore in each said arm intersecting and being perpendicular to said pivot axis of said means for pivotally mounting.

30. The joint as set forth in claim 1, wherein:

said two rolling elements on each said arm are integral with each other, forming a single roller on each said arm.

* * * * *